Jan. 21, 1930.  J. C. MORRELL  1,744,134
APPARATUS FOR VAPOR FRACTIONATION
Filed May 16, 1927
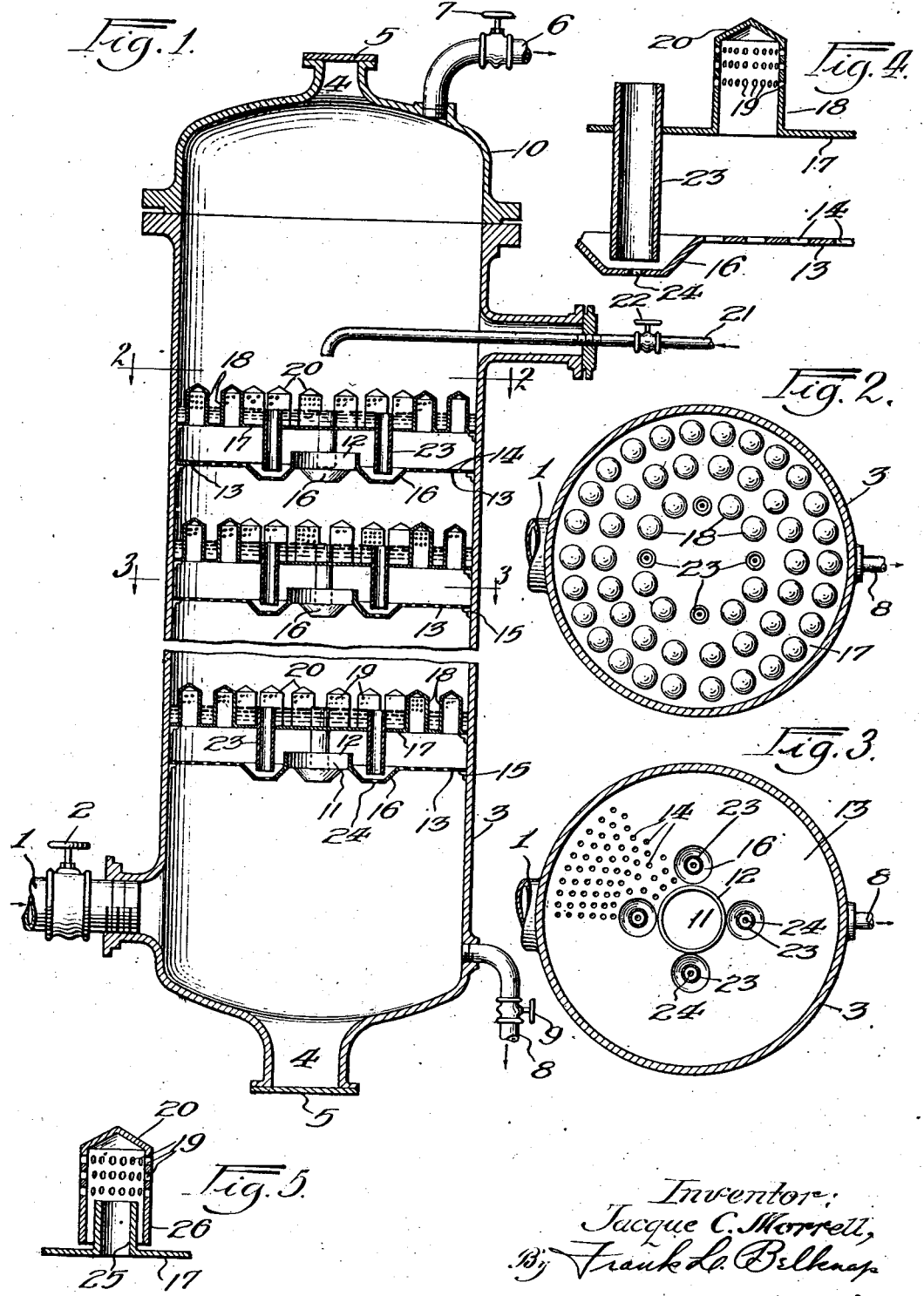
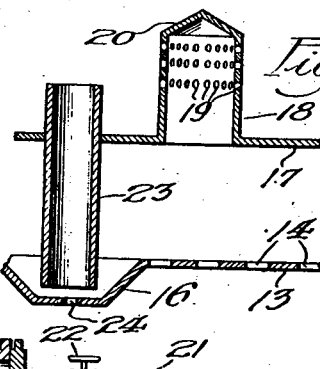
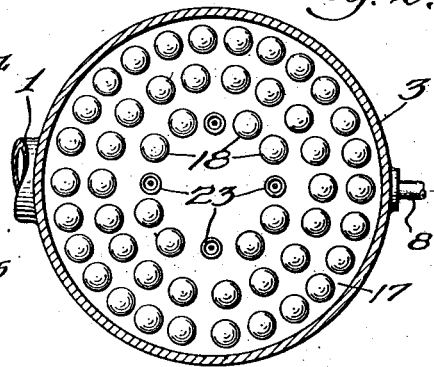
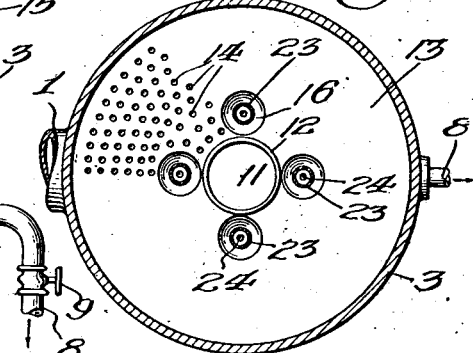
Inventor:
Jacque C. Morrell,
By Frank L. Belknap
Att'y Patented Jan. 21, 1930

1,744,134

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR VAPOR FRACTIONATION

Application filed May 16, 1927. Serial No. 191,619.

The present invention relates more particularly to improvements in the art of dephlegmating vapors and in one specific embodiment relates to the efficient fractionation and dephlegmation of hydro-carbon oil vapors produced in the cracking of hydro-carbon oil under heat and super-atmospheric pressure.

In its broad concept, the invention is directed to the dephlegmation of vapors produced from the heating of other liquids than hydro-carbon oil, such for instance as alcohol or the like.

The invention is adapted to be carried out under atmospheric, super-atmospheric, or sub-atmospheric pressures.

One of the standard fractionating columns used in the past has been of the sieve type. This tower, however, has comparatively small flexibility relative to its capacity and the velocity of the vapors passing through it due to the fact that the liquid descending in the tower is directly countercurrent to the ascending vapors. If the velocity of the vapors is too high, entrainment will occur upon the sieves or perforated decks, causing surging in the tower. On the other hand, if the velocity of the vapors is too low, substantially no liquid will be maintained upon the sieves, and the fractionating efficiency will decrease very rapidly.

It is the purpose of the present invention to obtain all of the benefits of the sieve type of tower when operated at proper capacity and to further obtain these benefits while changing the capacities and flow of vapors over wide ranges.

It is a further purpose of this invention to maintain in a positive and definite manner large bodies of liquid in equilibrium with vapors above these bodies and in a series of successive stages throughout the tower.

It is a still further purpose of the invention to provide a positive means for removing liquid from the deck elements of the tower while maintaining these bodies of liquid upon the decks and to distribute this liquid upon auxiliary decks in such manner that the positive downward flow of the liquid and the positive upward flow of the vapors is not interfered with in the spreading or distributing process, and as a feature of the invention the vapors are prevented from passing through pools of liquid.

A further object of the invention which constitutes an improvement over the past art in the application of the sieve type of tower is the obtaining of a transverse or horizontal directional flow of the vapors with respect to the down flowing liquid at the point of maximum contact between vapors and liquid so as to obtain positive impact and disruption of the liquid particles in the vapor zones above the decks.

The present invention brings about maximum intimate contact between vapors and liquid while at the same time subjecting the separated pools of liquid in each stage to the maximum time element whereby efficient fractionation takes place.

The auxiliary decks referred to above may preferably take the form of perforated pans which act as spreaders for the down flowing liquid, and also act as sieves in preventing to a large extent mechanical entrainment of liquid dispersed in the vapors from one compartment or stage to the next.

The utility of the invention, as well as other objects and advantages will be more particularly brought out in the following description.

Fig. 1 is a vertical sectional elevational view of a fractionating tower equipped to carry out the object of the present invention;

Fig. 2 is a cross-sectional view taken on line 2—2 of Fig. 1;

Fig. 3 is a cross-sectional view taken on line 3—3 of Fig. 1;

Fig. 4 is an enlarged fragmentary, vertical sectional view illustrating one design of dephlegmating element; and Fig. 5 is a similar view of a slightly modified form of construction.

Referring more in detail to the drawings, 1 designates a vapor inlet line in which may be interposed a valve 2 through which vapors from a concurrently operating distilling or cracking process may be introduced. The vapors discharge into the lower portion of an enlarged shell 3 which may be provided with manholes 4 and covers 5 at top and bottom, and with the vapor outlet 6, controlled by valve 7, and the liquid outlet 8, controlled by valve 9. This tower may or may not be externally insulated, as desired. A removable head 10 may close the top of the tower.

Vapors entering through the vapor outlet pipe 1 pass into the interior of the shell 3 and through the unobstructed central passageway 11 defined by the imperforate walls 12 of a deck 13. This deck 13 may comprise a plate taking the form of a sieve or screen and provided with a multiplicity of perforations 14. This plate is supported on suitable lugs, such as designated at 15. Immediately adjacent the walls 12, the plate is depressed below its normal horizontal plane to provide the depressed portion 16 which functions in the operation of the tower to provide a liquid seal, as will be hereinafter explained.

The vapors passing through the central passageway 11 spread out below the deck 17 thereabove, passing upwardly through the vapor risers 18 and out through the perforations 19 therein. As a feature of the present invention, the vapor risers 18 may comprise integral upstanding cap portions forming part of the deck 17 provided with perforations 19 only in the upper portion of the side wall thereof. The top of each riser 18 is closed by means of the imperforate cap 20 which may slope downwardly from an intermediate point, if found desirable, so as to obtain a gravitational flow of liquid over its surface.

Cooling liquid may be introduced through the liquid inlet line 21 in which may be interposed a valve 22, and cooling liquid together with those fractions of the vapors which condense as reflux collect on the imperforate deck 17 to a height regulated by the distance which the liquid overflow pipe 23 projects above the surface of the imperforate deck 17. It is to be particularly noted that the liquid overflow pipe 23 projects for a short distance above the surface of the imperforate deck 17 and for a much greater distance below said deck, discharging liquid into the depressed portion 16 of the perforated sieve-like tray 13. It may be particularly noted that the lower edge of the liquid overflow pipe 23 is disposed below the upper surface of the perforate deck 13 whereby a liquid seal is maintained in the depressed portion 16. A minute drain hole 24 is disposed in the base of the depressed portion 16 for the purpose of draining and preventing accumulation of solid foreign particles, the cross-sectional area of which hole is so computed as to maintain a liquid seal.

In Figs. 1 and 4, I have illustrated a vapor riser 18 which in reality is a combination vapor riser and cap manufactured as an integral unit. In Fig. 5 I have illustrated a slightly modified form of construction in which the vapor riser 25 is a separate structure from the cap 26. The cap is provided with the perforations 19 and roof 20.

The operation of the process and apparatus which comprise the subject matter of the present invention should be understood from the foregoing description. Vapors entering through the vapor inlet line 1 pass up through the central passageway 11 in the lowermost deck 13, thence upwardly through the vapor risers 18, through apertures or perforations 19, into the space therebetween and the deck 13 thereabove. As the vapors escape through the perforations 19, they must of necessity pass through a film or curtain of downwardly flowing liquid which falls from the deck above onto the roof 20, flowing downwardly and along the side wall of the vapor riser 18. In addition, as the vapors exit from the vapor risers of one deck and ascend between that deck and the perforated deck above, they pass through a rain of descending liquid, whereby maximum intimate contact between the liquid and vapors is brought about. In addition, by maintaining a pool of liquid on each deck, an equilibrium between the vapors and liquid is effected at each stage in the fractionating tower. The ascending vapors impacting against the lower surface of each of the imperforate decks 17 will impart some of their heat to the liquid pools maintained on said decks, resulting in a continual reboiling of the liquid on each deck whereby the lighter fractions have an opportunity to be released. It is to be noted that the vapors do not ascend through pools of liquid, but that intimate contact between vapors and liquid is brought about while each is in substantially a finely divided condition. It is also to be noted that the perforations 19 are above the liquid level of the pool maintained on each deck.

I claim as my invention:

1. A dephlegmating instrumentality comprising in combination a shell having a vapor inlet and outlet and a liquid inlet and outlet, imperforate superposed spaced decks mounted therein, vapor risers projecting upwardly from said decks provided with perforations in their upper side wall and an imperforate roof, liquid overflow pipes, each having a portion projecting above and below said imperforate decks whereby pools of liquid will collect on each imperforate deck, superposed spaced perforated decks, each disposed between a pair of imperforate decks and provided with depressed portions, the latter being disposed immediately below the lower end of the liquid overflow pipes, each perforate deck being provided with a centrally positioned unobstructed vapor passageway.

2. A dephlegmating instrumentality comprising in combination a shell having a vapor inlet and outlet and a liquid inlet and outlet, imperforate superimposed spaced decks mounted therein, vapor risers projecting upwardly from each of said decks provided with perforations in their upper side walls and an imperforate roof, said vapor risers being integrally united with said imperforate decks, liquid overflow pipes, each having a portion projecting above and below said imperforate decks whereby pools of liquid will collect on each imperforate deck, superposed spaced perforated decks, each disposed between a pair of imperforate decks and provided with depressed portions, the latter being disposed immediately below the lower end of the liquid overflow pipes, each perforate deck being provided with a centrally positioned unobstructed vapor passageway, the perforations in the vapor risers being disposed above the upper end of a corresponding liquid overflow pipe.

In testimony whereof I affix my signature.

JACQUE C. MORRELL.